United States Patent
Mihaylov et al.

(10) Patent No.: US 8,682,617 B2
(45) Date of Patent: Mar. 25, 2014

(54) EVALUATING MODELS USING FORECAST ERROR ATTRIBUTION

(75) Inventors: Kaloyan Mihaylov, New York, NY (US); Timothy J. Breault, Charlotte, NC (US); Harsh Singhal, Charlotte, NC (US); Magali F. Van Belle, Charlotte, NC (US); Wei Wei, Cranford, NJ (US)

(73) Assignee: Bank of America Corporation, Charlotte, NC (US)

( * ) Notice: Subject to any disclaimer, the term of this patent is extended or adjusted under 35 U.S.C. 154(b) by 326 days.

(21) Appl. No.: 13/187,638

(22) Filed: Jul. 21, 2011

(65) Prior Publication Data

US 2013/0024160 A1     Jan. 24, 2013

(51) Int. Cl.
*G06F 15/00* (2006.01)

(52) U.S. Cl.
USPC ............................ 702/185; 705/7.31; 705/400

(58) Field of Classification Search
USPC .............. 702/85, 182, 183, 185–188; 703/18; 705/5, 7.31, 7.35, 400
See application file for complete search history.

(56) References Cited

U.S. PATENT DOCUMENTS

2004/0128261 A1*  7/2004  Olavson et al. ............... 705/400
2008/0255924 A1   10/2008 Chien et al.

* cited by examiner

*Primary Examiner* — John H Le
(74) *Attorney, Agent, or Firm* — Banner & Witcoff, Ltd.; Michael A. Springs

(57) ABSTRACT

Methods, computer readable media, and apparatuses for evaluating models using forecast error attribution are presented. According to one or more aspects, one or more input values corresponding to one or more input variables may be forecast. One or more results of a modeling function may be calculated using the one or more forecasted input values. Thereafter, actual performance data corresponding to the modeling function may be received. One or more holdout values for the modeling function may be calculated using the actual performance data. Subsequently, a graph that includes the one or more results of the modeling function, the actual performance data, and the one or more holdout values for the modeling function may be plotted. In some arrangements, the one or more holdout values for the modeling function may be indicative of one or more assumption errors made with respect to the one or more forecasted input values.

20 Claims, 12 Drawing Sheets

EVALUATING MODELS USING FORECAST ERROR ATTRIBUTION

TECHNICAL FIELD

One or more aspects of the disclosure generally relate to computing devices, computing systems, and computer software. In particular, one or more aspects of the disclosure generally relate to computing devices, computing systems, and computer software that may be used by an organization, such as a financial institution, or other entity in evaluating models, such as financial models, using forecast error attribution.

BACKGROUND

Increasingly, organizations, such as financial institutions, may use statistical models to forecast revenues, losses, and a variety of other metrics so as to better plan for the future and make more informed business decisions. As the use of such statistical models becomes more and more common, the importance of understanding and improving the accuracy of such models likewise grows.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to evaluating models, such as financial models, using forecast error attribution. In particular, by implementing one or more aspects of the disclosure, an organization, such as a financial institution, may be able to better understand how well various models are performing and what factors are contributing to different amounts of error in forecasting, whether such errors flow from the models themselves, the input values associated with the models, and/or the assumptions underlying the same.

According to one or more aspects, one or more input values corresponding to one or more input variables may be forecast. Subsequently, one or more results of a modeling function may be calculated using the one or more forecasted input values. Thereafter, actual performance data corresponding to the modeling function may be received. One or more holdout values may be calculated for the modeling function using the actual performance data. Then, a graph that includes the one or more results of the modeling function, the actual performance data, and the one or more holdout values for the modeling function may be plotted.

In some arrangements, the one or more holdout values for the modeling function may be indicative of one or more assumption errors made with respect to the one or more forecasted input values. In one or more additional arrangements, one or more coefficients of the modeling function may be recalibrated based on the actual performance data, and one or more new data error values may be calculated for the modeling function using the one or more recalibrated coefficients. The one or more new data error values for the modeling function may be indicative of one or more model errors made with respect to one or more original coefficients of the modeling function.

In still more arrangements, the one or more assumption errors may be decomposed by attributing one or more error contribution amounts to each of the one or more forecasted input values. In such arrangements, this attributing may include incrementally actualizing each of the one or more forecasted input values based on the actual performance data.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1A:
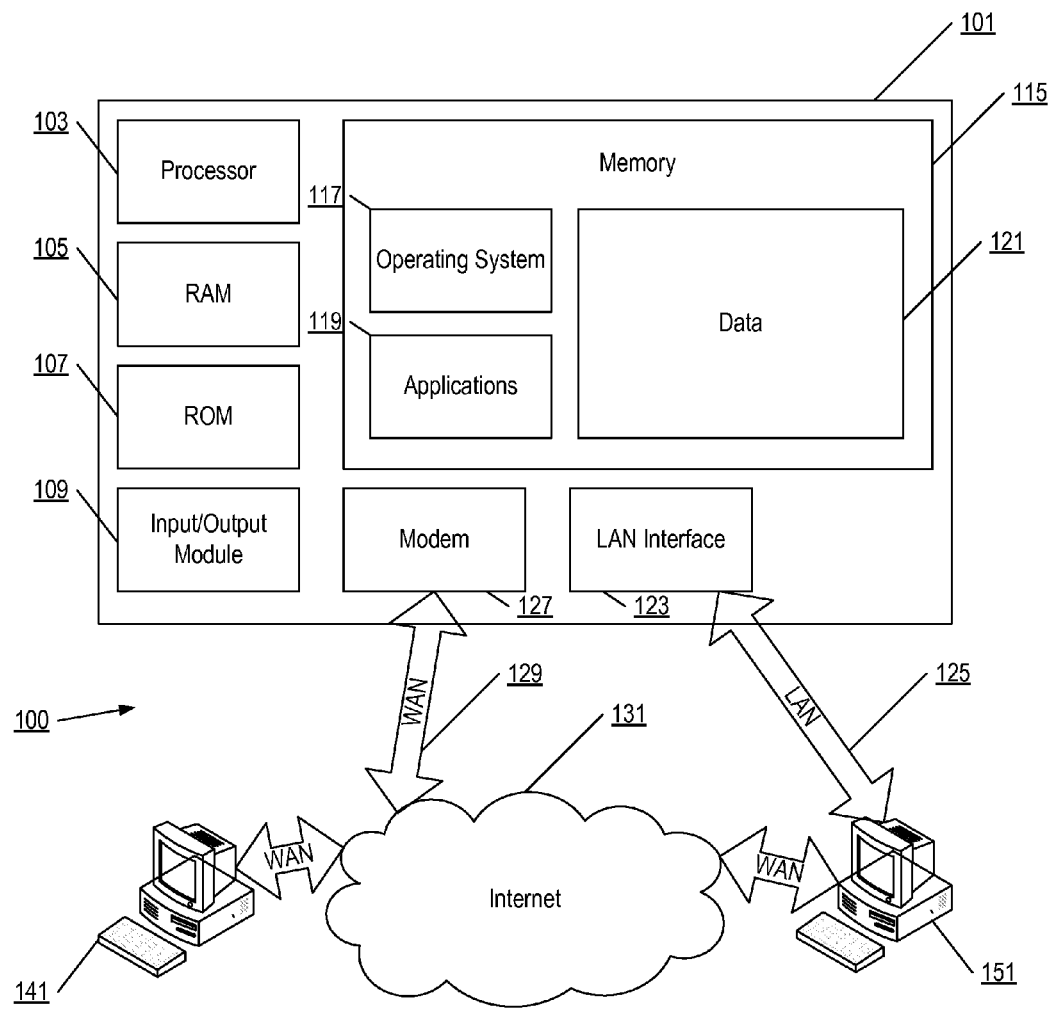
FIG. 1A illustrates an example operating environment in which various aspects of the disclosure may be implemented.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, smartphones, PDAs, notebooks, and the like) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
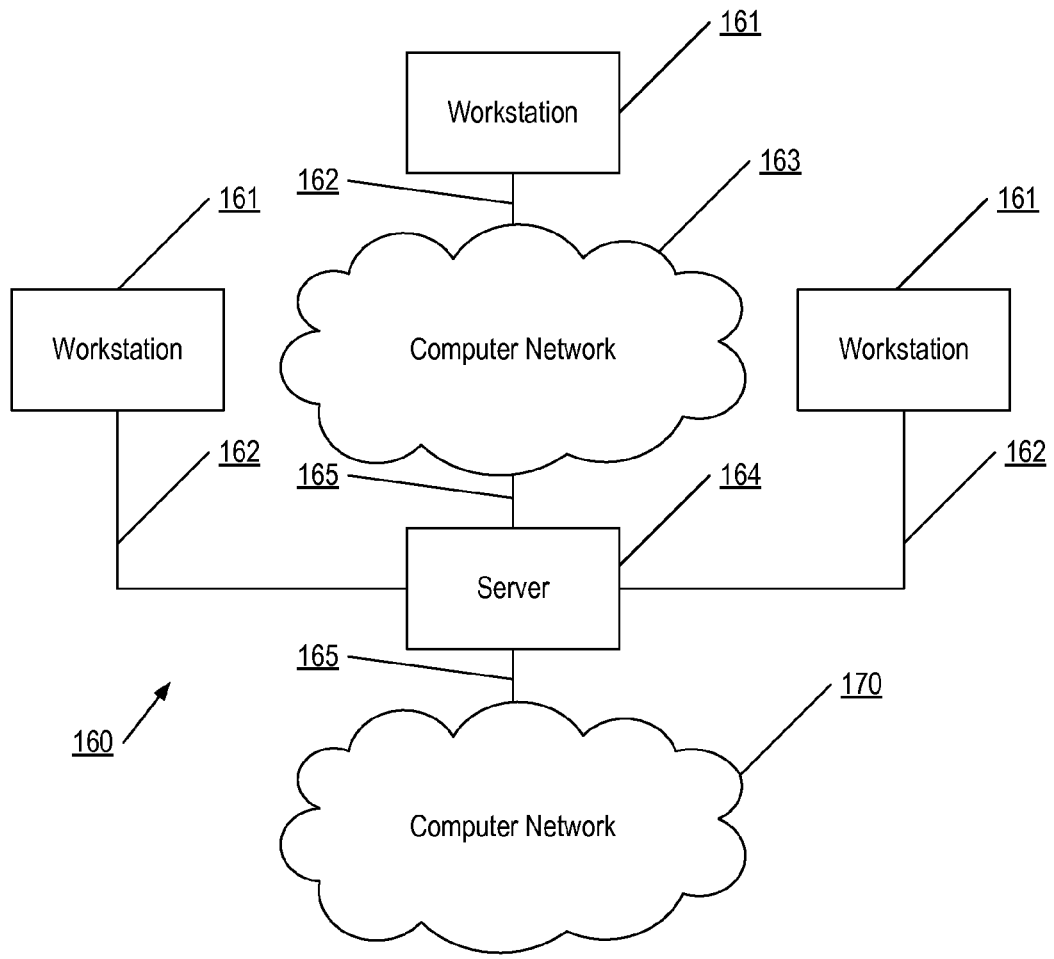
FIG. 1B illustrates another example operating environment in which various aspects of the disclosure may be implemented.

FIG. 1B illustrates another example operating environment in which various aspects of the disclosure may be implemented. As illustrated, system 160 may include one or more workstations 161. Workstations 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/or may be located remotely from the financial institution. For instance, one or more workstations 161 may be located within a branch office of a financial institution. Such workstations may be used, for example, by customer service representatives, other employees, and/or customers of the financial institution in conducting financial transactions via network 163. Additionally or alternatively, one or more workstations 161 may be located at a user location (e.g., a customer's home or office). Such workstations also may be used, for example, by customers of the financial institution in conducting financial transactions via computer network 163 or computer network 170.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between workstations 161 and server 164, such as network links, dial-up links, wireless links, hard-wired links, and the like.

Figure 2:
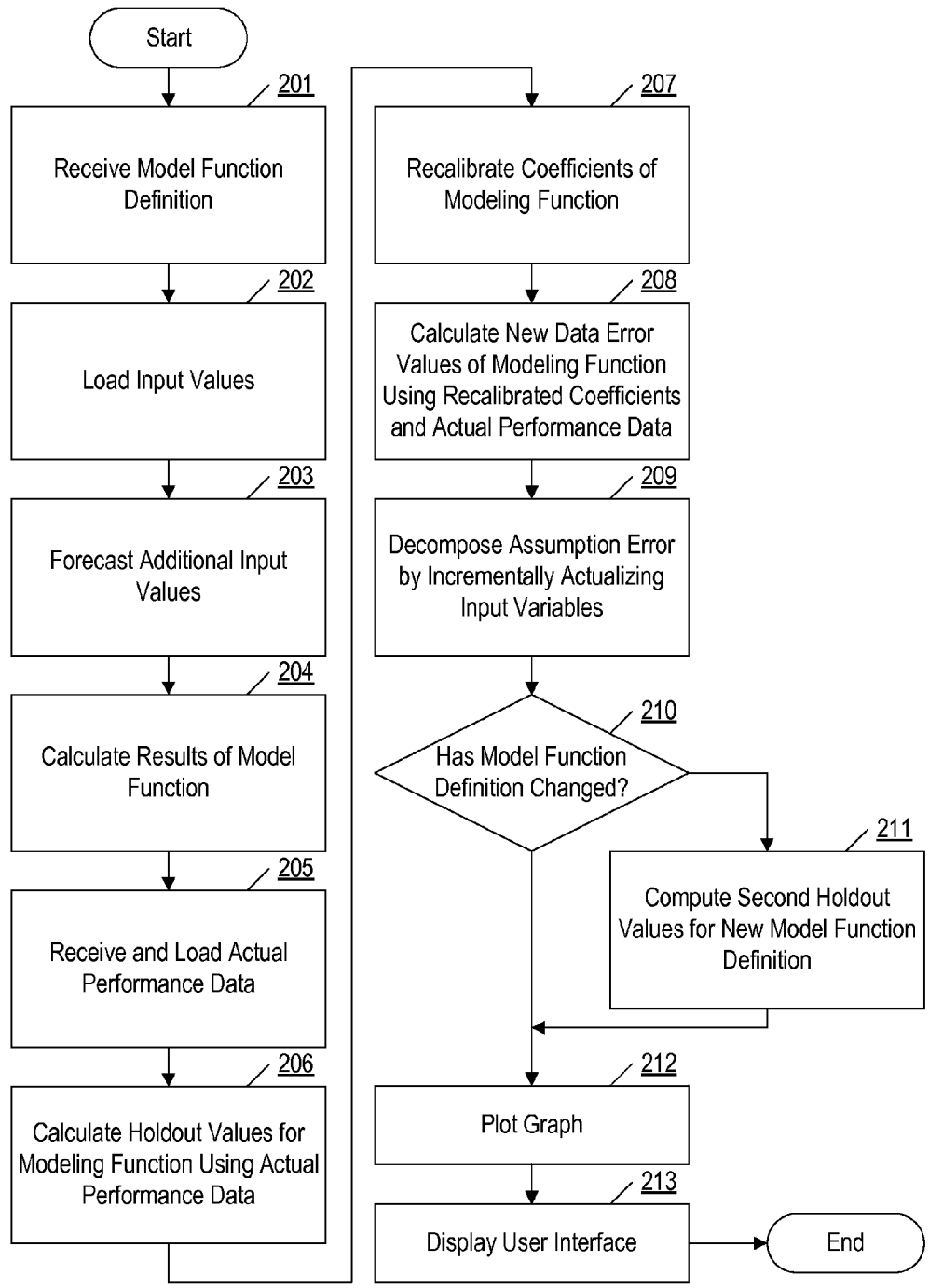
FIG. 2 illustrates a method of evaluating models using forecast error attribution according to one or more illustrative aspects described herein.

FIG. 2 illustrates a method of evaluating models using forecast error attribution according to one or more illustrative aspects described herein. According to one or more aspects, the methods described herein may be implemented by software executed on one or more computers, such as the generic computing device 101 of FIG. 1A, and/or by a computing system, such as system 160 of FIG. 1B. In at least one arrangement, the methods described herein may be performed by and/or in combination with a server (e.g., server 164). Additionally or alternatively, the methods described herein may be performed by and/or in combination with one or more workstations (e.g., workstations 161).

In step 201, a model function definition may be received. For example, in step 201, a computing device, such as computing device 101 or server 164, may receive a model function definition (e.g., by receiving user input providing the model function definition, by locating and loading a file storing the model function definition, and the like). According to one or more aspects, a model function definition may be a mathematical equation that includes one or more input variables and one or more coefficients, where each coefficient of the one or more coefficients may correspond to and/or multiply a particular input variable of the one or more input variables. The mathematical equation that makes up any given model function may be a linear function, a polynomial function, or any other type of mathematical function. For instance, a hypothetical model may be defined and/or expressed as a mathematical equation, such as $Y=X_A^t A^t + X_B^t B^t + X_C^t B^t$. In this equation, Y may represent the trend and/or metric being predicted and/or modeled (e.g., net credit losses incurred by an organization, such as a financial institution, in servicing one or more accounts); $A^t$, $B^t$, and $C^t$ may represent input variables with actual historical values up to time t and with forecasted values thereafter (e.g., unemployment, house price index, and number of account acquisitions at time t, with forecasted values for times subsequent to time t, as further discussed below); and $X_A^t, X_B^t, X_C^t$ may be coefficients (corresponding to their respective input variables) that represent model parameters calibrated from actual historical values up to time t.

In addition, the model function definition (and the mathematical equation that makes up the model function definition) may define a modeling function that may be used by an organization, such as a financial institution, in predicting one or more trends. In at least one arrangement, the financial institution may use different model function definitions to predict different trends. For example, a financial institution may use a first model function definition to predict a trend in net credit losses, and the financial institution may use a second model function definition to predict a trend in revenue. Other types of trends that may be predicted using different model function definitions include trends in income, number of new account activations, credit card losses, home loan losses, and/or any other desired statistic.

In step 202, one or more input values may be loaded. For example, in step 202, the computing device may load one or more input values, such as input values corresponding to one or more of the input variables of the model function definition. In one or more arrangements, the input values may be statistics, metrics, sub-metrics, and/or other data that are loaded from one or more account information tables and/or databases, such as account portfolio information tables and transaction databases created and maintained by the financial institution. For instance, if the model function definition received in step 201 relies on the current house price index (e.g., the national house price index for the current month), then in step 202, the computing device may retrieve from a data table, and load into memory, the current house price index. In one or more additional arrangements, the input values may be loaded by the computing device according to a predetermined schedule, such as on a daily, weekly, or monthly basis. For instance, the computing device may be configured to automatically load the input values for the current month on a particular day of each month when the data for the most recent month is made available.

In step 203, one or more additional input values may be forecast. For example, in step 203, the computing device may forecast one or more input values, such as input values corresponding to one or more of the input variables of the model function definition for which values might not have been loaded in step 202. In one or more arrangements, the additional input values may be forecast using other modeling functions and/or mathematical equations and may represent extrapolated and/or otherwise predicted values for the input variables at times in the future. For instance, if the model function definition received in step 201 relies on gross domestic product in one or more future months as an input variable (e.g., the gross domestic product in the one or more future months is used in calculating/predicting the results of the modeling function for the one or more future months), then in step 203, the computing device may forecast values for gross domestic product in the one or more future months (e.g., using one or more regressions, equations, and/or other predictive mathematical functions).

In step 204, the results of the modeling function may be calculated. For example, in step 204, the computing device may calculate the results of the modeling function using the coefficients defined by the model function definition and the input values loaded and/or forecasted in the previous steps that correspond to the various input variables included in the model function definition. In one or more arrangements, the computing device may calculate the result of the modeling function at a current time t and at one or more future times (e.g., t+1, t+2, and the like) so as to predict future behavior of the trend modeled by the modeling function. For instance, the computing device may calculate the result of the modeling function at a time t using the input values loaded for time t and the corresponding coefficients from the model function definition by substituting these values and coefficients into the modeling function and computing the result thereof. In addition, the computing device may calculate the result of the modeling function at a future time t+1 using the input values forecasted for time t+1 and the corresponding coefficients from the model function definition by similarly substituting these values and coefficients into the modeling function and computing the result thereof.

In step 205, actual performance data may be received and loaded. For example, in step 205, after a period of time elapses (such as a day, week, month, three months, six months, and the like, over which the trend modeled by the modeling function is being computed and evaluated), the computing device may receive and load actual performance data for the particular time period. In one or more arrangements, actual performance data may be received and loaded (and the subsequent steps of the method of FIG. 2 may be performed) on a more frequent basis than the period of time over which the trend modeled by the modeling function is being computed and evaluated. For instance, if the computing device is modeling net credit losses over a six-month period in monthly units, the computing device may receive and load actual performance data (e.g., to be used as input values and/or in the subsequent steps of this method, such as in recalibrating coefficients) on a monthly basis. In addition, the actual performance data may be representative of and/or otherwise indicate the actual values of one or more previously forecasted input variables and/or values. For instance, if the current month's gross domestic product was forecasted and used in the previous month in computing/predicting results of the modeling function for the current month, the actual performance data received and loaded in step 205 may include the actual value of gross domestic product for the current month.

Figure 3:
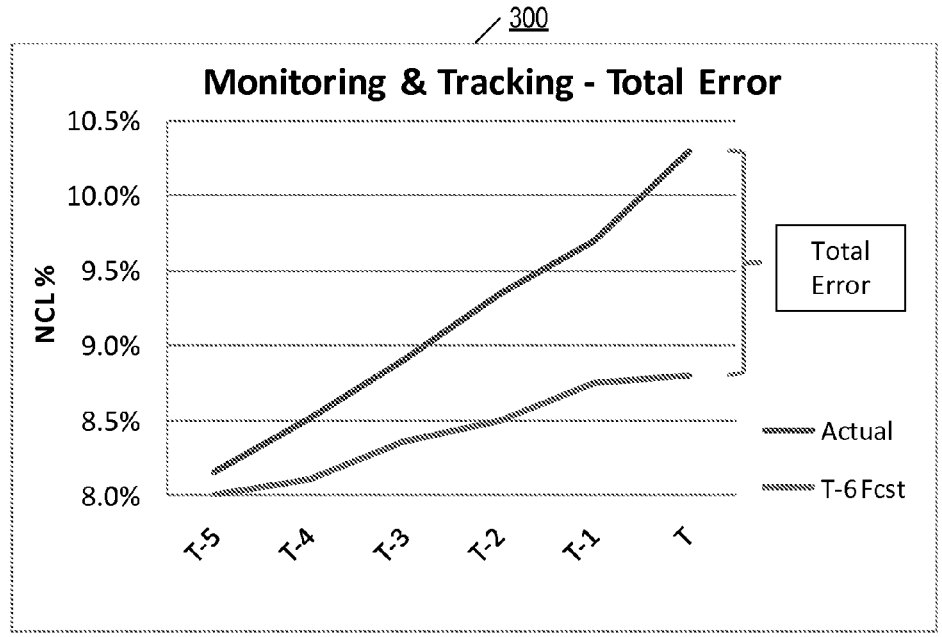
FIGS. 3-9 illustrate example graphs in which various error components are identified according to one or more illustrative aspects described herein.

In one or more instances, the actual performance data might not align with the results of the modeling function over a corresponding period of time. To the extent that the actual performance data deviates from the results of the modeling function over the same period of time, the amount of deviation (at the various points of time for which the modeling function is computed/evaluated) may represent the total error associated with the modeling function. For example, FIG. 3 illustrates an example graph 300 in which actual performance data (represented by the upper line in the graph) deviates from the results of the modeling function (represented by the lower line in the graph) computed for the same points in time (e.g., times t, t−1, t−2, etc. and the like). As seen in example graph 300, the amount of deviation between the lines at time t, for instance, may represent the total error associated with the modeling function at time t, as the difference between the two lines indicates the extent to which the modeling function inaccurately predicted what the subject trend (e.g., the trend being modeled by the modeling function, such as net credit losses) would be at time t. By performing the subsequent steps of the method of FIG. 2, as further described below, the total error may be broken down into various sub-error amounts, which together may contribute to the total error associated with the modeling function. Moreover, by performing this method and determining (e.g., using a computing device) these various sub-error amounts, an organization, such as a financial institution, may gain a better understanding of how well one or more models are performing and what factor or factors are causing inaccuracies in such model(s).

Referring again to FIG. 2, in step 206, one or more holdout values for the modeling function may be calculated using the actual performance data. According to one or more aspects, calculating holdout values for the modeling function essentially may include calculating the results of the modeling function for the same points in time as before (e.g., as in step 204), but using the actual performance data as input values of the modeling function in place of corresponding forecasted input values (where possible). By calculating holdout values in this way, one or more assumption errors made with respect to the forecasted input values may be identified, as further described below.

For example, in step 206, the computing device may calculate the results of the modeling function at various points in time, using input values taken from the actual performance data corresponding to the various points in time, and these results may be the one or more holdout values for the modeling function. Because the calculated holdout values thus may represent how the modeling function would have performed had the original input values of the modeling function been perfectly correct, these calculated holdout values may produce a trend line that separates, on a graph, the deviation between the actual performance data and the original, previously calculated results of modeling function.

Figure 4:
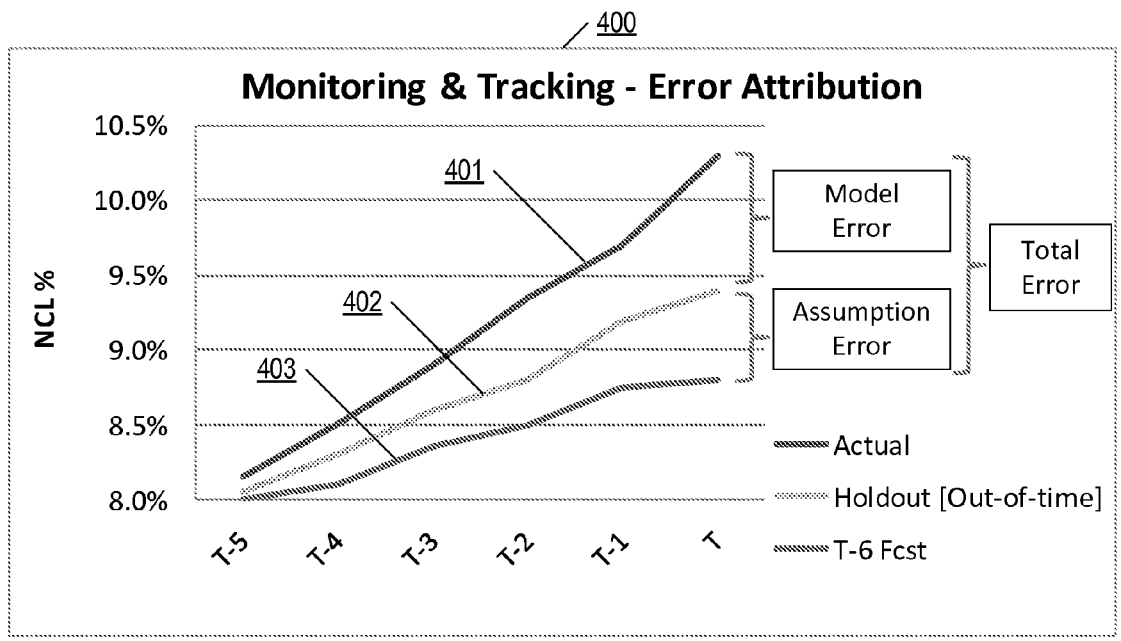

More particularly, in one or more instances, the total error (e.g., the amount to which the actual performance data deviates from the result of the modeling function at a particular point in time) may be made up of both model error and assumption error. For example, FIG. 4 illustrates an example graph 400 in which the deviation (and thus the total error) between the actual performance data (represented by the upper line 401 in the graph) and the results of the modeling function (represented by the lower line 403 in the graph) are separated by a trend line 402 (the middle line in the graph) representing the holdout values calculated in step 206. As seen in graph 400, to the extent that the holdout values deviate from the previously computed values of the modeling function, this first amount of deviation may represent "assumption error" or the extent to which the total error (e.g., the deviation between the actual performance data and the results of the modeling function) may be attributed to incorrect assumptions and/or forecasts as to the input values used in originally calculating the previous results of the modeling function. This is so because, as noted above, the trend line 402 formed by the holdout values represents how the modeling function would have performed if the input values used in originally calculating the results of the modeling function (e.g., at time t−6) had been perfectly correct (e.g., if the previously forecasted input values had precisely coincided with the actual performance data).

In addition, as also seen in graph 400, to the extent that the holdout values deviate from the actual performance data, this second amount of deviation may represent "model error" or the extent to which the total error (e.g., the deviation between the actual performance data and the results of the modeling function) may be attributed the modeling function failing to accurately fit the trend line created by the actual performance data (e.g., because one or more coefficients of the modeling function were incorrect and/or may require recalibration, because one or more input variables were incorrectly included in the model function definition, because one or more variables should have been included as input variables in the model function definition but were erroneously left out, etc. and the like). Again, this is so because as noted above, the trend line 402 formed by the holdout values represents how the modeling function would have performed if the input values used in originally calculating the results of the modeling function (e.g., at time t−6) had been perfectly correct (e.g., if the previously forecasted input values had precisely coincided with the actual performance data). Thus, to the extent that the actual performance data deviates from the trend line 402 formed by the holdout values, this deviation may be a consequence of flaws in the model itself, rather than a consequence of flaws in the forecasts and assumptions about input values underlying the original computation of results of the modeling function.

Referring again to FIG. 2, in step 207, one or more coefficients of the modeling function may be recalibrated. For example, in step 207, the computing device may recalibrate one or more coefficients of the modeling function (e.g., as originally defined by the model function definition received in step 201) in view of the actual performance data. In some instances, this recalibration of coefficients of the modeling function may be necessitated by the actual performance data indicating that the trend modeled by the modeling function has begun behaving differently than previously modeled by the model function definition. In other words, in some instances, recalibration of coefficients may be performed in instances where the actual performance data deviates more than a predetermined amount from the trend line produced by the holdout values (e.g., calculated in step 206) and/or the original computation of results of the modeling function (e.g., calculated in step 204). Such deviation may occur because, for instance, the original coefficients were calibrated for the modeling function based on data available at time t−6, whereas actual performance data for time t is now available, and the coefficients of the modeling function may be recalibrated in view of this newer actual performance data accordingly.

In step 208, one or more new data error values for the modeling function may be calculated using the recalibrated coefficients and the actual performance data. For example, in step 208, the computing device may calculate the results of the modeling function at various points in time, using both the recalibrated coefficients (e.g., as recalibrated in step 207 above) and the input values taken from the actual performance data corresponding to the various points in time (in place of the originally forecasted input values used in previously calculating the results of the modeling function, e.g., in step 204 above). Because these new data error values thus may represent how the modeling function would have performed had the original input values of the modeling function been perfectly correct and the calibration of the modeling function's coefficients been perfectly correct (e.g., in view of the actual performance data), these new data error values may produce a trend line that separates, on a graph, the deviation between the trend line produced by the holdout values and the actual performance data.

Figure 5:
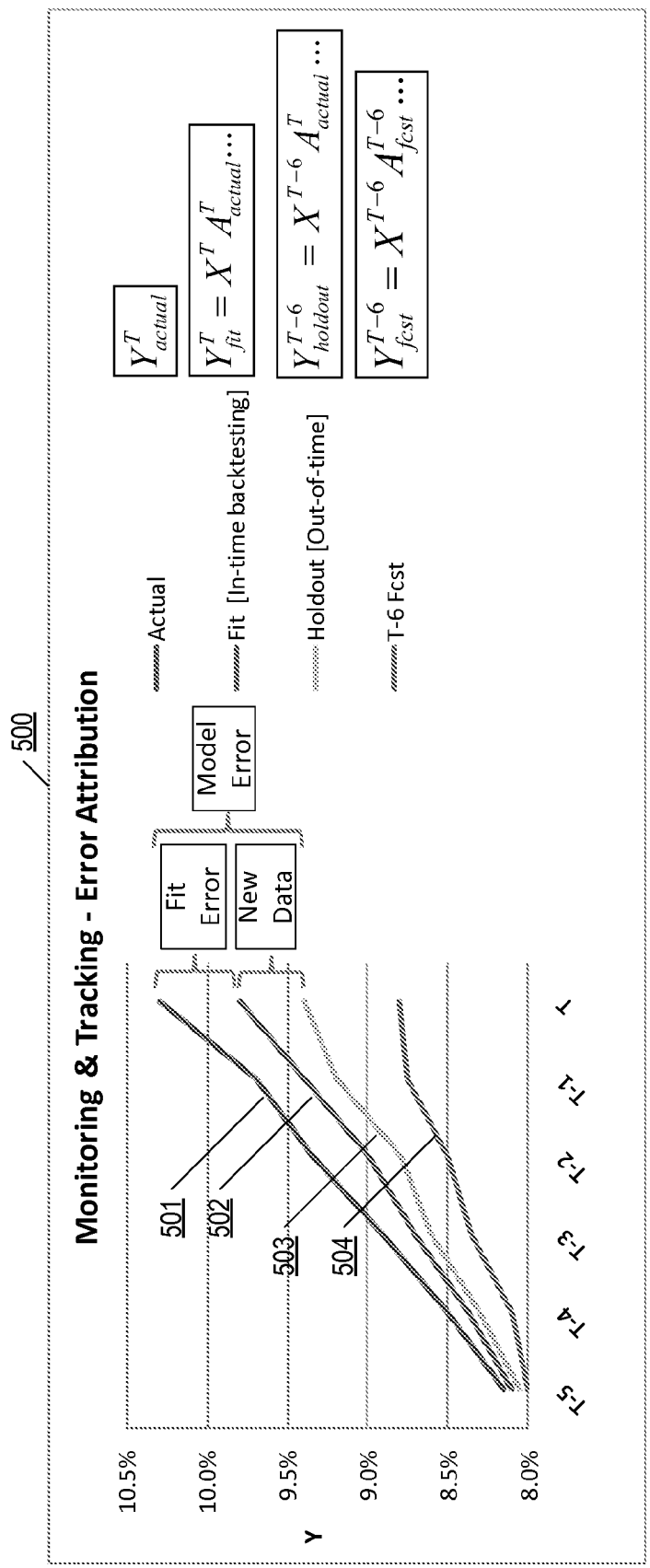

In particular, in one or more instances, the model error (e.g., the deviation between the trend line produced by the holdout values and the actual performance data) may be made up of new data error and fit error. For example, FIG. 5 illustrates an example graph 500 in which the deviation between the actual performance data (represented by the upper line 501 in the graph) and the trend line produced by the holdout values (represented by the line 503 in the graph that is the second from the bottom) are separated by a trend line 502 (the line in the graph that is the second from the top) representing the one or more new data error values calculated in step 208. As seen in graph 500, to the extent that the new data error values deviate from the holdout values (e.g., the holdout values calculated in step 206), this amount of deviation may represent "new data error" or the extent to which the model error (e.g., the deviation between the actual performance data and the holdout values) may be attributed to incorrect calibration of coefficients (e.g., the extent to which the new data at current time t changes the coefficients of the model function definition as compared to the corresponding coefficients of the model function definition at a previous point in time, such as time t−6). This is so because the trend line 502 formed by the new data error values represents how the modeling function would have performed if the input values used in originally calculating the results of the modeling function (e.g., at time t−6) had been perfectly correct and if the coefficients of the modeling function had been calibrated (e.g., at time t−6) to reflect the actual performance data (which became available at current time t).

In addition, as also seen in graph 500, to the extent that the new data error values deviate from the actual performance data, this amount of deviation may represent "fit error" or the extent to which the model error (e.g., the deviation between the trend line 503 produced by the holdout values and the trend line 501 produced by the actual performance data) may be attributed to the modeling function otherwise failing to accurately fit the trend line created by the actual performance data (e.g., because the modeling function fails to take into account one or more input variables that should be taken into account and/or because the modeling function accounts for one or more input variables that should not be accounted for or included).

Referring again to FIG. 2, in step 209, the assumption error (e.g., as may be indicated and/or determined in step 206 when the one or more holdout values are calculated) for the modeling function may be decomposed by incrementally actualizing input variables of the modeling function. According to one or more aspects, by decomposing the assumption error in this way, one or more individual error contribution amounts may be attributed to each of the one or more forecasted input valuables. In other words, by implementing such decomposition, an organization, such as a financial institution, may be able to identify particular variables used in a particular modeling function that are resulting in the inaccuracy of the model (when compared to the actual performance data) and the related measured errors. [40] For example, in step 209, the computing device may incrementally actualize input values of the modeling function by replacing previously forecasted input values for a single input variable of the modeling function with corresponding input values from the actual performance data, computing the result of the modeling function, and then repeating the process by replacing previously forecasted input values for another single input variable of the modeling function with corresponding input values from the actual performance data, and again computing the result of the modeling function, and so on until all input variables have been actualized (e.g., at which point the result of the modeling function would be the holdout values calculated above in step 206).

Figure 6:
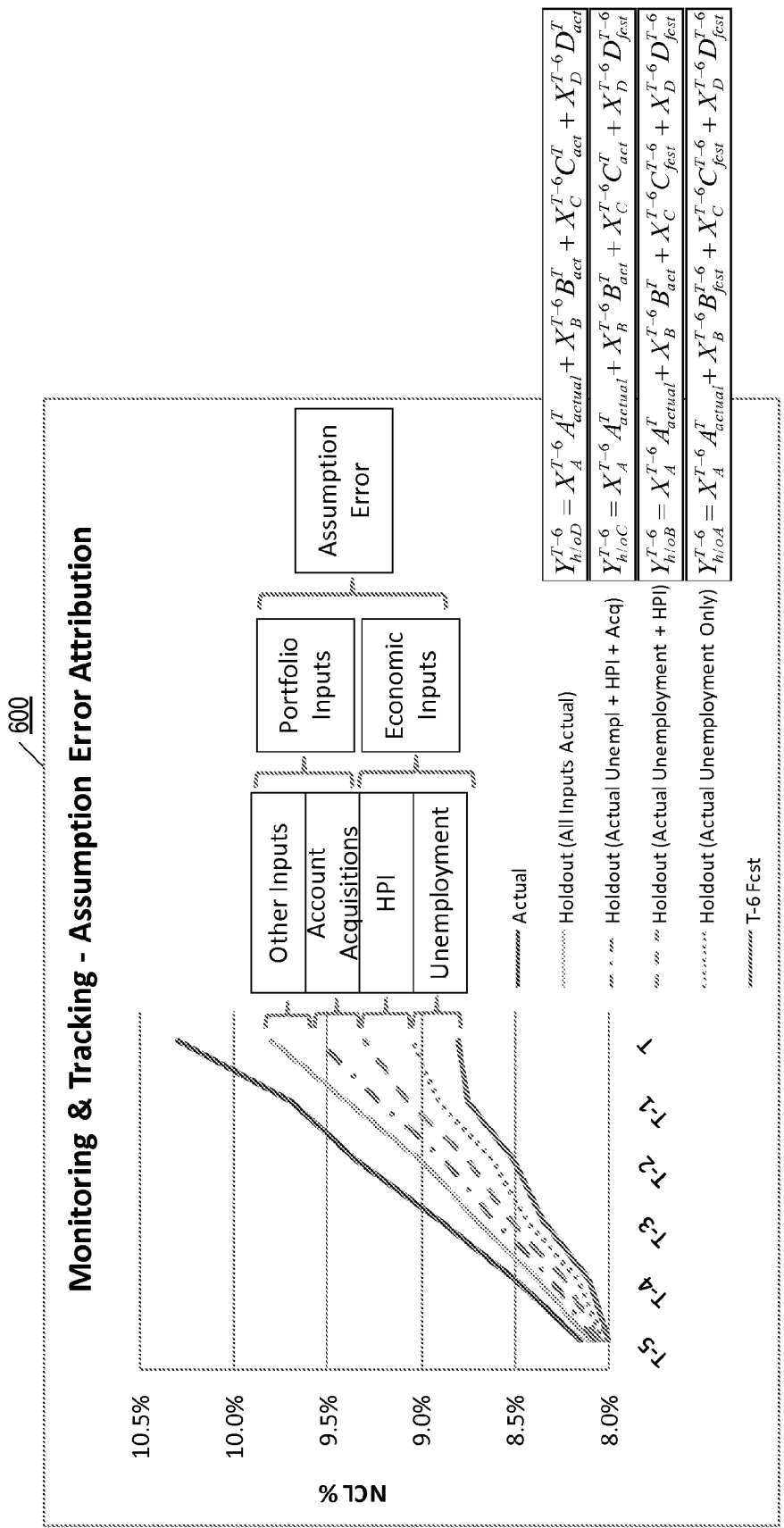

FIG. 6 illustrates an example graph 600 in which assumption error has been decomposed so as to attribute various components of the assumption error to particular input variables. In particular, in example graph 600, assumption error has been decomposed so as to attribute particular error amounts to errors in forecasting unemployment and house price index (HPI), which both represent economic inputs, and further to attribute particular error amounts to errors in forecasting account acquisitions and other inputs, which represent portfolio inputs. In addition, as seen in the equations included in graph 600 and the legend thereto, the decomposition of assumption error and incremental actualization of input variables began with first actualizing the input values corresponding to unemployment, and then continued by successively actualizing the input values corresponding to HPI and account acquisitions. This incremental actualization produced the trend lines seen in graph 600, thereby allowing for the attribution of particular amounts of error to particular input variables, similar to how such trend lines were produced and how such error amounts were attributed in the examples discussed above.

According to one or more aspects, more accurate error attribution may be achieved by actualizing economic inputs (such as unemployment, HPI, other macro-economic statistics and indicators, and the like) prior to actualizing portfolio inputs (such as account acquisitions, other statistics and metrics dealing more particularly with transactions involving a financial institution or other organization implementing these methods, and the like). Thus, in the example illustrated in FIG. 6, input values corresponding to the unemployment variable in the model are actualized prior to input values corresponding to the HPI variable in the model, which are actualized prior to input values corresponding to the account acquisitions variable in the model.

Figure 9:
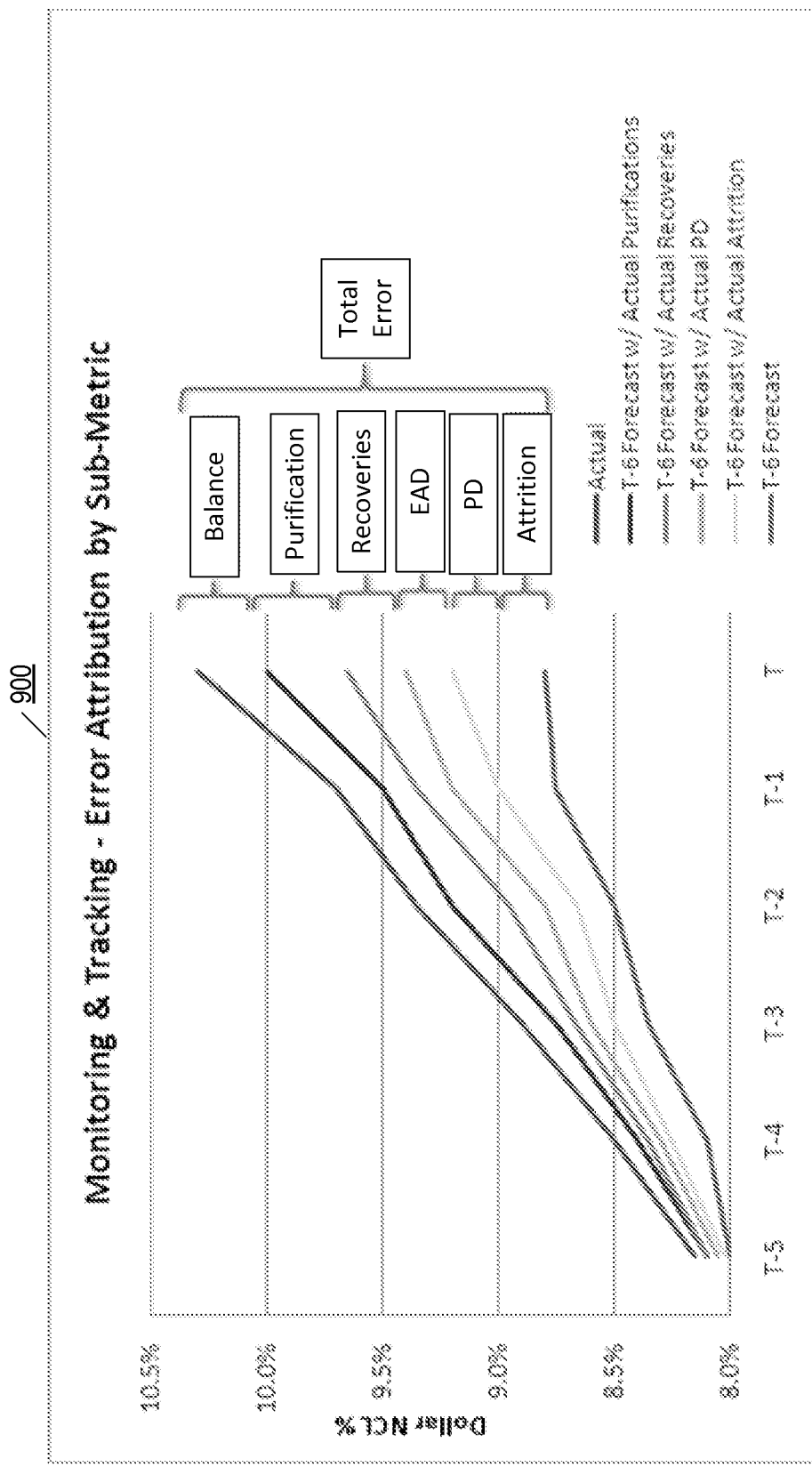

In some alternative arrangements, a model function definition may include as input variables one or more sub-models and/or sub-metrics. In such arrangements, error contributions may be attributed to the various sub-models and/or sub-metrics upon which the modeling function is based by incrementally actualizing the input values that are used by the modeling function and taken from the sub-models and/or sub-metrics, similar to how such input values may be incrementally actualized in the examples described above. For instance, FIG. 9 illustrates an example graph 900 in which particular error amounts are attributed to particular sub-metrics by incrementally actualizing inputs, as similar to the incremental actualization of input values described in the examples above. As seen in graph 900, this incremental actualization allows particular amounts of the total error to be attributed to individual input variables (which in this instance happen to be sub-metrics) associated with the modeling function.

Referring again to FIG. 2, in step 210, it may be determined whether the modeling function and/or its model function definition have changed. For example, in step 210, the computing device may determine whether the model function definition corresponding to the modeling function has changed. According to one or more aspects, a model function definition may have changed if one or more new coefficients and/or input variables have been added to the model function definition. For instance, if a model function definition previously defined a modeling function as relying on three input variables but now defines the modeling function as relying on four input variables, the modeling function may be considered changed.

If it is determined, in step 210, that the modeling function has changed, then in step 211, a second set of holdout values may be computed for the changed modeling function based on the modified model function definition. For example, in step 211, the computing device may calculate a second set of holdout values by using the modified model function definition to calculate the results of the changed modeling function by replacing input values of the changed modeling function with corresponding input values from the actual performance data, similar to how holdout values were calculated for the original modeling function in step 206.

Figure 7:
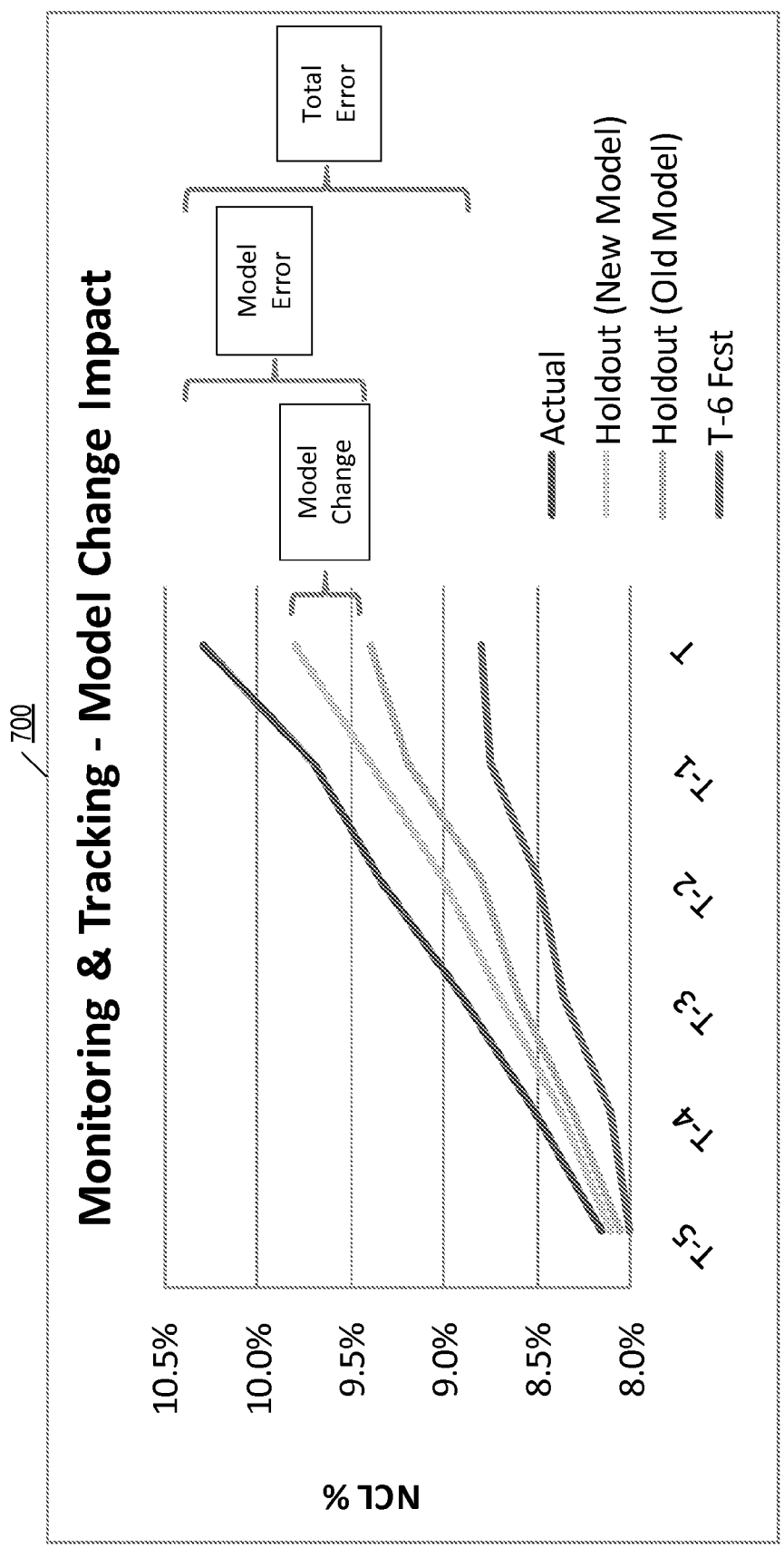

FIG. 7 illustrates an example graph 700 in which a trend line produced by this second set of holdout values separates the actual performance data and a second trend line produced by a first set of holdout values representing the holdout values for the original modeling function (e.g., as calculated in step 206). As seen in graph 700, changes in the model function definition itself may account for some amount of model error when calculating various error amounts comparing the original results of the modeling function and the actual performance data.

Referring again to FIG. 2, in step 212, a graph that includes the results of the modeling function, the actual performance data, and/or one or more trend lines may be plotted. For example, in step 212, the computing device may plot and/or display one or more graphs that include any and/or all of the results of the modeling function, the actual performance data, and/or the one or more trend lines described above.

Figure 8:
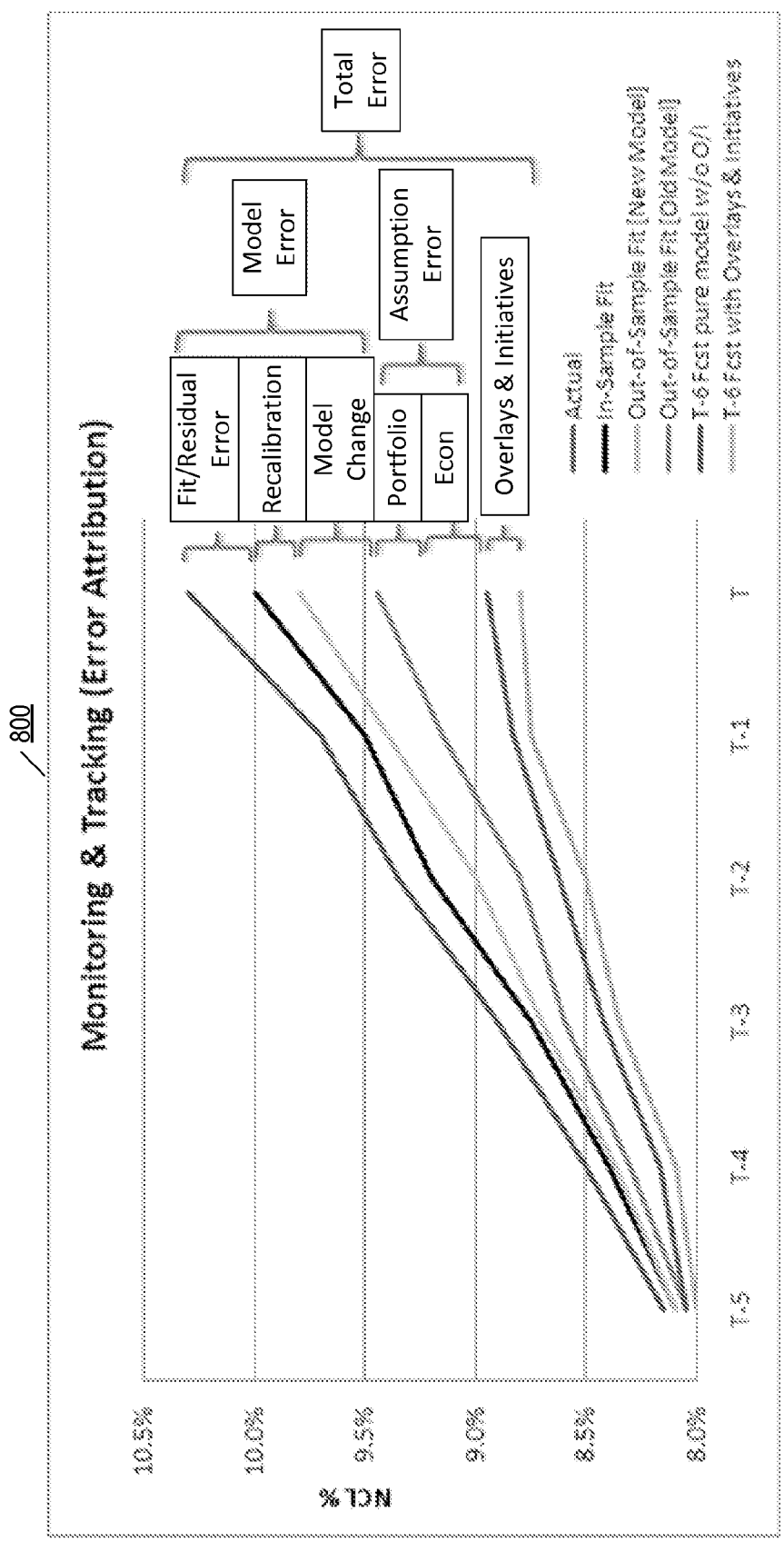

FIG. 8 illustrates an example graph 800 that includes several of the various trend lines described above, delineating total error, model error, assumption error, and different sub-components of error thereof for a particular model at particular points in time. Graph 800 also includes an "Overlays & Initiatives" trend line, which may represent a discretionary forecast adjustment created by management to address specific elements that might not be captured by a particular model. In one or more arrangements, it may be beneficial to include management overlays and initiatives in forecast error attribution graphs in order to assess the accuracy and effectiveness of management decisions (e.g., as compared to model values and/or actual performance data).

Referring again to FIG. 2, in step 213, one or more user interfaces may be displayed, and the one or more user interfaces may enable one or more users to view, interact with, and/or modify any and/or all of the modeling function, the actual performance data, and one or more of the trend lines described above. For example, in step 213, the computing device may display one or more user interfaces (or may cause such user interfaces to be displayed) to an employee of the financial institution, so as to facilitate the analysis of and/or the preparation of reports regarding one or more modeling functions and their corresponding forecast error analyses (e.g., as produced by performing one or more steps of the method described above). In one or more arrangements, any and/or all of these user interfaces may be delivered to and/or displayed to a user via a web portal or Internet page, such as an internal corporate web portal used by a financial institution and/or provided via a secure corporate intranet. Additionally or alternatively, one or more of these user interfaces may resemble the example user interfaces illustrated in FIGS. 10-12, which are further described below.

Having thus described an example method of evaluating models using forecast error attribution, several example user interfaces that may be used in implementing such features will now be described.

Figure 10:
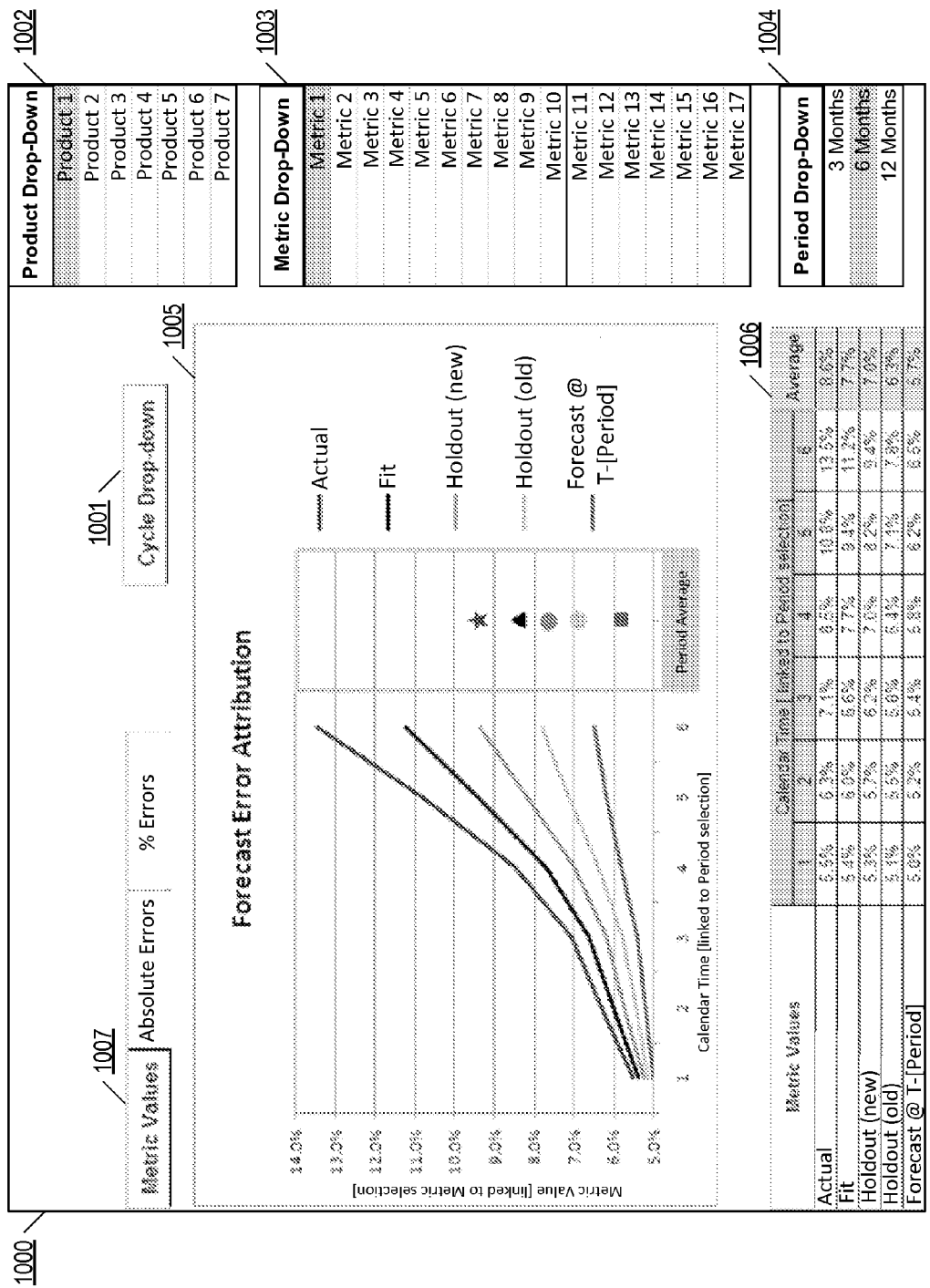
FIGS. 10-12 illustrate example user interfaces that may be displayed by a computing device when evaluating models using forecast error attribution according to one or more illustrative aspects described herein.
Figure 11:
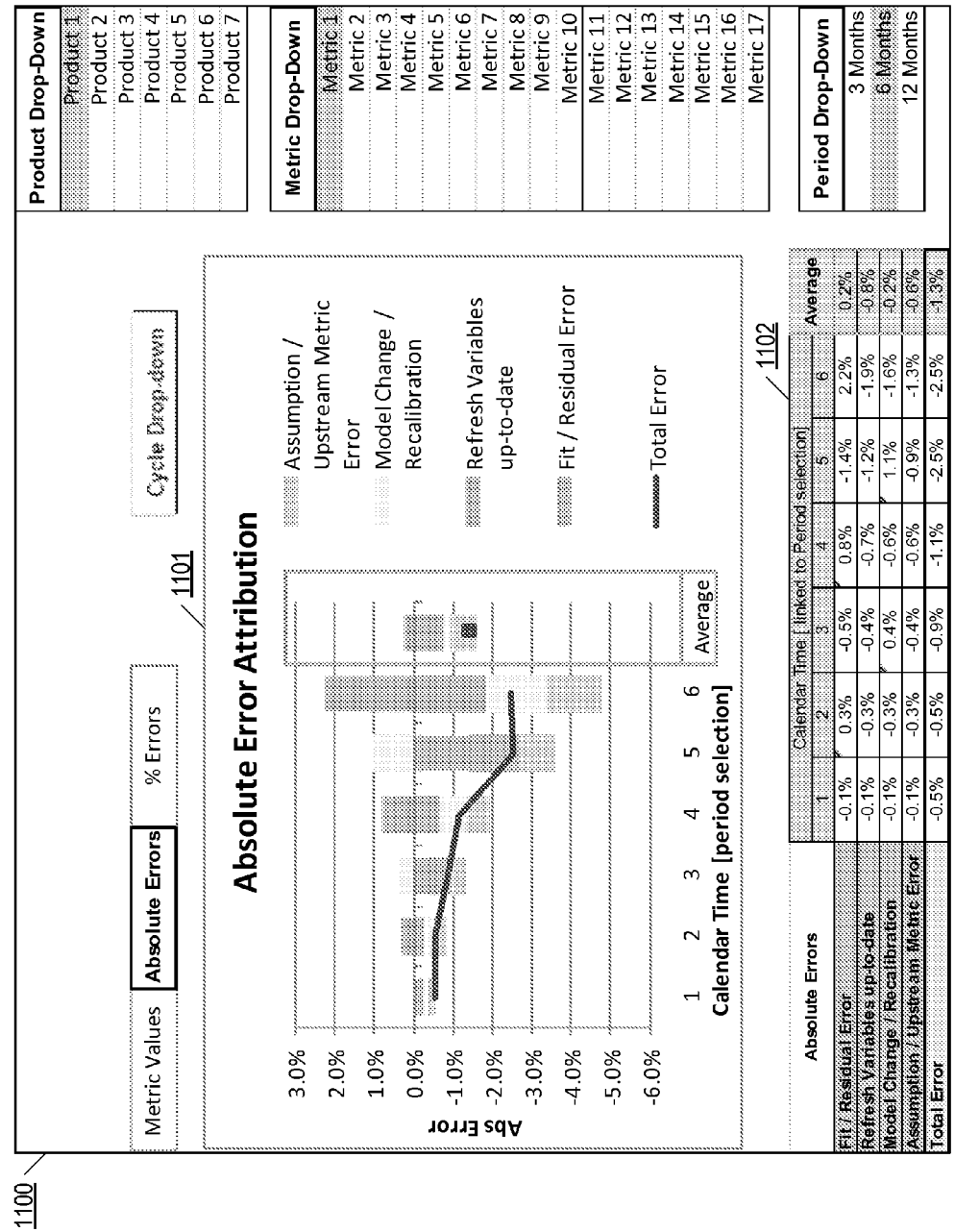
Figure 12:
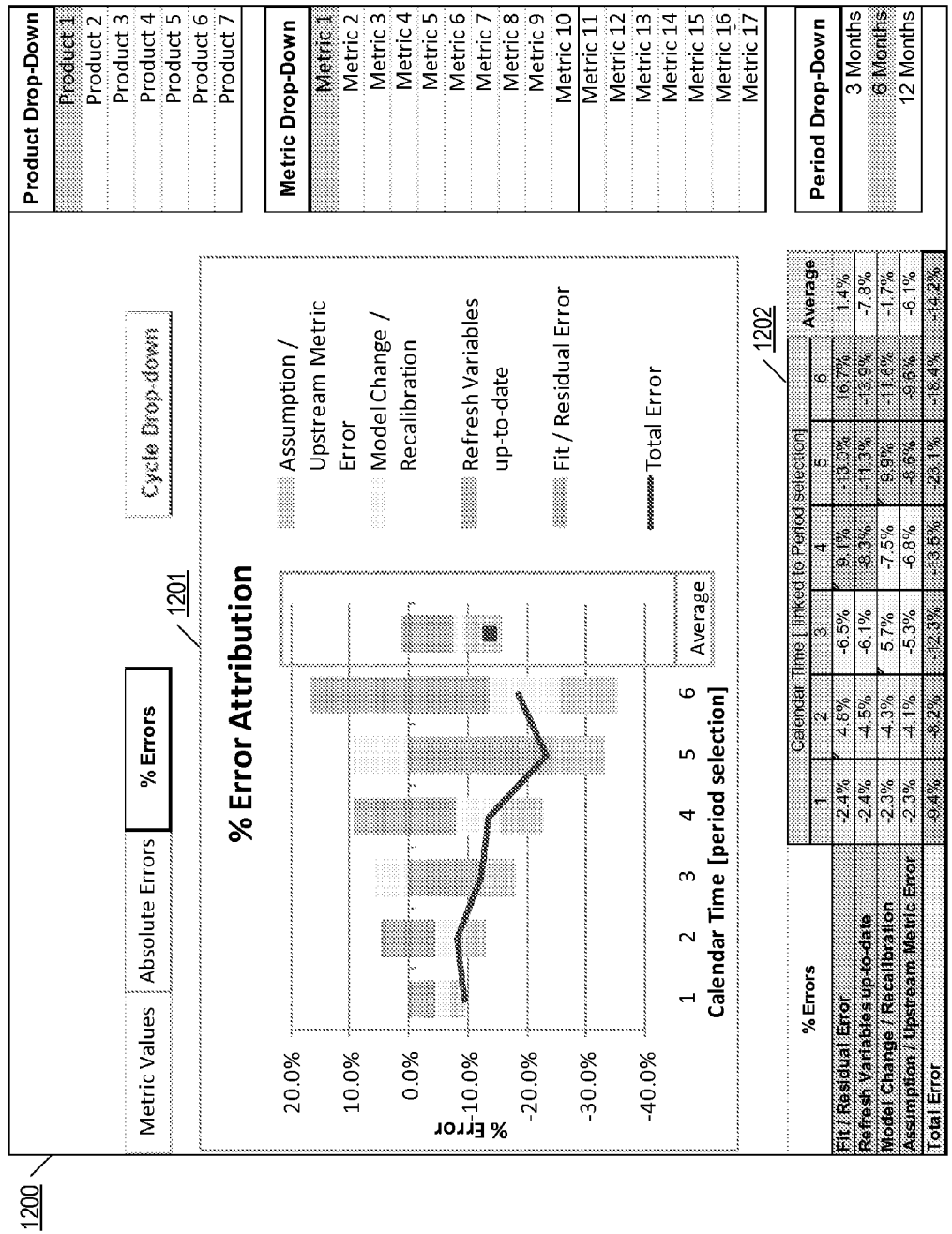

FIGS. 10-12 illustrate example user interfaces that may be displayed by a computing device when evaluating models using forecast error attribution according to one or more illustrative aspects described herein. For instance, FIG. 10 illustrates an example user interface 1000 in which results of a particular modeling function may be displayed at particular points in time, along with actual performance data and several of the trend lines described above. In addition, user interface 1000 may include a cycle drop-down menu 1001, which may allow a user to view and/or analyze data associated with a different cycle; a product drop-down menu 1002, which may allow a user to select different products offered by an organization, such as a financial institution, with respect to which data should be modeled and/or displayed; a metric drop-down menu 1003, which may allow a user to view and/or analyze a different model and data associated therewith; a period drop-down menu 1004, which may allow a user to select a different time period over which data should be displayed in graph 1005; and data table 1006 in which numerical data corresponding to graph 1005 may be displayed. Additionally or alternatively, user interface 1000 may include a toolbar 1007, which may allow a user to navigate to and/or view different graphs that present data in different ways than such data is presented in graph 1005.

For example, while data presented in graph 1005 of user interface 1000 may be shown in terms of the value of the particular model or metric being displayed and/or analyzed, data presented in graph 1101 of user interface 1100, as seen in FIG. 11, may be shown in terms of the absolute error of the particular error components. Similarly, data table 1102 may include numerical data corresponding to the absolute error of the particular error components shown in graph 1101. Additionally or alternatively, data presented in graph 1201 of user interface 1200, as seen in FIG. 12, may be shown in terms of the relative error of particular error components, and data table 1202 may include numerical data corresponding to the relative error of the particular error components shown in graph 1201.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. An apparatus, comprising:
   at least one processor; and
   memory storing computer-readable instructions that, when executed by the at least one processor, cause the apparatus to:
   forecast one or more input values corresponding to one or more input variables of a modeling function;
   calculate one or more results of the modeling function using the one or more forecasted input values;
   receive actual performance data corresponding to the modeling function;
   calculate one or more holdout values for the modeling function using the actual performance data; and
   plot a graph that includes a plot of the one or more results of the modeling function, a plot of the actual performance data, and a plot of the one or more holdout values for the modeling function.

2. The apparatus of claim 1, wherein the one or more holdout values for the modeling function are indicative of one or more assumption errors made with respect to the one or more forecasted input values.

3. The apparatus of claim 2, wherein the memory stores additional computer-readable instructions that, when executed, further cause the apparatus to:
   recalibrate based on the actual performance data, one or more coefficients of the modeling function; and
   calculate one or more new data error values for the modeling function using the one or more recalibrated coefficients.

4. The apparatus of claim 3, wherein the one or more new data error values for the modeling function are indicative of one or more model errors made with respect to one or more original coefficients of the modeling function.

5. The apparatus of claim 2, wherein the memory stores additional computer-readable instructions that, when executed, further cause the apparatus to:
   decompose the one or more assumption errors by attributing one or more error contribution amounts to each of the one or more forecasted input values.

6. The apparatus of claim 5, wherein attributing one or more error contribution amounts to each of the one or more forecasted input values includes incrementally actualizing each of the one or more forecasted input values based on the actual performance data.

7. The apparatus of claim 5, wherein the memory stores additional computer-readable instructions that, when executed, further cause the apparatus to:

display a user interface that includes the plotted graph and the one or more error contribution amounts.

8. A method, comprising:
forecasting, by a computing device, one or more input values corresponding to one or more input variables of a modeling function;
calculating, by the computing device, one or more results of the modeling function using the one or more forecasted input values;
receiving, by the computing device, actual performance data corresponding to the modeling function;
calculating, by the computing device, one or more holdout values for the modeling function using the actual performance data; and
plotting, by the computing device, a graph that includes a plot of the one or more results of the modeling function, a plot of the actual performance data, and a plot of the one or more holdout values for the modeling function.

9. The method of claim 8, wherein the one or more holdout values for the modeling function are indicative of one or more assumption errors made with respect to the one or more forecasted input values.

10. The method of claim 9, further comprising:
recalibrating, by the computing device, based on the actual performance data, one or more coefficients of the modeling function; and
calculating, by the computing device, one or more new data error values for the modeling function using the one or more recalibrated coefficients.

11. The method of claim 10, wherein the one or more new data error values for the modeling function are indicative of one or more model errors made with respect to one or more original coefficients of the modeling function.

12. The method of claim 9, further comprising:
decomposing, by the computing device, the one or more assumption errors by attributing one or more error contribution amounts to each of the one or more forecasted input values.

13. The method of claim 12, wherein attributing one or more error contribution amounts to each of the one or more forecasted input values includes incrementally actualizing each of the one or more forecasted input values based on the actual performance data.

14. The method of claim 12, further comprising:
displaying, by the computing device, a user interface that includes the plotted graph and the one or more error contribution amounts.

15. At least one non-transitory computer-readable medium having computer-executable instructions stored thereon that, when executed, cause at least one computing device to:
forecast one or more input values corresponding to one or more input variables of a modeling function;
calculate one or more results of the modeling function using the one or more forecasted input values;
receive actual performance data corresponding to the modeling function;
calculate one or more holdout values for the modeling function using the actual performance data; and
plot a graph that includes a plot of the one or more results of the modeling function, a plot of the actual performance data, and a plot of the one or more holdout values for the modeling function.

16. The at least one non-transitory computer-readable medium of claim 15, wherein the one or more holdout values for the modeling function are indicative of one or more assumption errors made with respect to the one or more forecasted input values.

17. The at least one non-transitory computer-readable medium of claim 16, having additional computer-executable instructions stored thereon that, when executed, further cause the at least one computing device to:
recalibrate based on the actual performance data, one or more coefficients of the modeling function; and
calculate one or more new data error values for the modeling function using the one or more recalibrated coefficients.

18. The at least one non-transitory computer-readable medium of claim 17, wherein the one or more new data error values for the modeling function are indicative of one or more model errors made with respect to one or more original coefficients of the modeling function.

19. The at least one non-transitory computer-readable medium of claim 16, having additional computer-executable instructions stored thereon that, when executed, further cause the at least one computing device to:
decompose the one or more assumption errors by attributing one or more error contribution amounts to each of the one or more forecasted input values.

20. The at least one non-transitory computer-readable medium of claim 19, wherein attributing one or more error contribution amounts to each of the one or more forecasted input values includes incrementally actualizing each of the one or more forecasted input values based on the actual performance data.

* * * * *